United States Patent
Sogawa et al.

(10) Patent No.: US 6,493,309 B2
(45) Date of Patent: Dec. 10, 2002

(54) PICKUP ADJUSTING MECHANISM FOR A DISC PLAYER

(75) Inventors: Teruaki Sogawa, Osaka (JP); Noritaka Tanabe, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 10/033,802

(22) Filed: Jan. 3, 2002

(65) Prior Publication Data

US 2002/0089917 A1 Jul. 11, 2002

(30) Foreign Application Priority Data

Jan. 9, 2001 (JP) ..................... P.2001-000911

(51) Int. Cl.[7] ............... G11B 7/08; G11B 21/16
(52) U.S. Cl. .................... 369/244; 369/44.21
(58) Field of Search .................. 369/244, 44.21, 369/249

(56) References Cited

U.S. PATENT DOCUMENTS 5,640,287 A * 6/1997 Hwang et al. ............ 360/85
5,768,248 A * 6/1998 Lee ....................... 369/215

FOREIGN PATENT DOCUMENTS

| JP | 59-125730 U | 8/1984 |
| JP | 61-149112 U | 9/1986 |
| JP | 8-171726 A | 7/1996 |

* cited by examiner

Primary Examiner—David Davis
Assistant Examiner—Jennifer M Dolan
(74) Attorney, Agent, or Firm—Morgan, Lewis & Bockius LLP

(57) ABSTRACT

In a pickup 5 laterally moving by being guided at its one side by a main shaft 4, an inclined piece 5a tilted frontwardly and obliquely downwardly in an opening portion 1a inside a chassis 1 is opposite to the shaft 4. A screw 6 for adjusting the tilt angle of the pickup 5 is obliquely upwardly or downwardly screwed into the inclined piece 5a, and its lower part is placed inside the pickup 5. A flange-like holding portion 6A which is integral with the lower part of this screw 6 is fitted to the opposite opening edge 1b, and the bottom surface edge 6b partially abuts against the chassis 1 top surface and the edge 6b laterally moves by sliding along the top surface when the pickup 5 laterally moves. The edge 6b slides along the top surface near the edge 1b when the pickup 5 laterally moves.

4 Claims, 6 Drawing Sheets

RELATED ART

PICKUP ADJUSTING MECHANISM FOR A DISC PLAYER

BACKGROUND OF THE INVENTION

1. Field of the Invention

The present invention relates to a pickup adjusting mechanism for a disc player, which is enabled to adjust the tilt angle of the pickup capable of laterally moving in an opening portion provided inside a chassis of a disc player.

2. Description of the Related Art

Hitherto, there has been a conventional adjusting mechanism for adjusting such a tilt angle, which is, for example, an optical head described in JP-A-8-171726.

As illustrated in FIGS. 2A, 2B, and 3, this optical head is equipped in an optical information recording/reproducing apparatus for optically recording information on, reproducing information from, or deleting information from an information recording medium surface. The optical head has an optical pickup actuator 109, and a carriage 110 for carrying the actuator 109. Further, a tapered surface 101 is provided on one of the actuator 109 and the carriage 110. A spherical portion 102 to be brought into sliding contact with the tapered surface 101 is provided in the other of the actuator 109 and the carriage 110. Thus, the optical head is adapted to adjust the inclination of the actuator 109 by putting the tapered surface 101 and the spherical portion 102 into sliding contact with each other. In this optical head, an adhesive agent 111 is applied onto the tapered surface 101 or the spherical portion 102. Thereafter, the inclination adjustment is performed by attaching the tapered surface 101 and the spherical portion 102 to each other. After the inclination adjustment, the actuator 109 is fixed to the carriage 110 by hardening the adhesive agent.

However, in this optical head, the tapered surface 101 and the spherical portion 102 are fastened to each other, because the adhesive agent hardens after the inclination adjustment thereof. Thus, this conventional optical head has a drawback in that the inclination adjustment cannot be performed after the tapered surface 101 and the spherical portion 102 are fastened to each other. Moreover, this conventional optical head is configured so that the angle of the carriage 110 with respect to a rail 113 cannot be adjusted.

Further, JP-A-59-125730U describes a pickup adjusting mechanism for a disc player.

As illustrated in FIGS. 4 and 5, the disc player comprises a support device for rotating and driving a disc 204, a pickup 214a opposed to an information recording surface of the disc 204 at a predetermined distance, and a carriage 210 for supporting this pickup 214a and for moving the pickup 214a along the disc 204. In this disc player, a fulcrum screw 215 is attached to the carriage 210 in such a way as to be able to go up and down. A portion of the support member 213 for supporting the pickup 214a, which is provided right under the pickup, is supported at a tip end of this fulcrum screw 215. Adjusting screws 219a and 219b, which are positioned at a predetermined distance from the fulcrum screw 215, and other adjusting screws 221a and 221b positioned at a predetermined distance from the fulcrum screw 215 in a direction nearly perpendicular to a direction, in which the screws 219a and 219b are placed, are inserted into the carriage 210. All the tip ends of the adjusting screws 219a, 219b, 221a, and 221b are screwed into the support member 213.

However, this conventional mechanism has a drawback in that friction caused by the adjusting screws 219a, 219b, 221a, and 221b themselves is not taken into account at all.

Further, JP-A-61-149112U describes a conventional apparatus for adjusting an optical axis of a pickup in a CD player.

As shown in FIGS. 6A and 6B, a first chassis 305, to which pickup guide shafts 303a and 303b are attached, and a second chassis 310, to which a turntable 306 is attached in such a way as to be parallel with the first chassis 305, are provided in a CD player that needs the adjustment of inclination of an optical axis of a pickup 301. The first chassis 305 is inclined to the second chassis 310 by turning the first chassis 305 around the pickup guide shaft 303a or 303b serving as a fulcrum.

However, this conventional apparatus has a drawback in that the adjusting portion is not in contact with the chassis 305 and 310.

SUMMARY OF THE INVENTION

An object of the invention is to solve the drawbacks of the conventional apparatus, and to provide a pickup adjusting mechanism for a disc player, which enables a pickup to bring a secondary-shaft-side part into point contact with a chassis. The pickup has a tilt angle which is adjusted. The secondary shaft side part is opposed to a main-shaft-side part. As a result, the secondary-shaft-side part can laterally move, that reliability in holding the secondary-shaft-side part can be enhanced, and that the lateral movement of the pickup with respect to the chassis can be stably performed.

The invention is proposed to solve the aforementioned drawbacks. According to an aspect of the invention, there is provided a pickup adjusting mechanism (hereunder referred to as a first pickup adjusting mechanism of the invention) for a disc player, which comprises an inclined piece portion tilted frontwardly and obliquely downwardly in an opening portion inside a drive chassis and provided at a side opposite to a main shaft in a pickup adapted to laterally move by being guided at one side thereof by the main shaft, a screw for adjusting a tilt angle of the pickup, which is obliquely upwardly or downwardly screwed into the inclined piece portion so that a lower part thereof is placed at an inner part of the pickup, a flange-like holding portion that is provided in such a way as to be integral with the lower part of this screw and that has a sidewise-H-like section in a plan view thereof, and that is fitted to the opposite opening edge, so that the bottom surface edge of an upper flange portion abuts against a part of the top surface of the drive chassis, which is in the vicinity of the opening edge, and so that the bottom surface edge of this screw laterally moves by sliding along and being in contact with the part of the top surface, which is in the proximity of the opening edge, when the pickup laterally moves. In this mechanism, at least the bottom surface side portion of the peripheral edge of the upper flange-like portion of the flange-like holding portion is chamfered, so that an inner edge part of this chamfered portion laterally moves by sliding along and being in contact with the top surface placed in the vicinity of the opening edge. Moreover, the mounting angle θ of the screw screwed into the pickup with respect to the drive chassis is set in such a way as to be larger than an adjusting amount of the tilt angle of the pickup.

According to another aspect of the invention, there is provided a pickup adjusting mechanism (hereunder referred to as a second pickup adjusting mechanism of the invention) for a disc player, which comprises an inclined piece portion tilted frontwardly and obliquely downwardly in an opening portion inside a drive chassis and provided at a side opposite to a main shaft in a pickup adapted to laterally move by being guided at one side thereof by the main shaft, a screw for adjusting a tilt angle of the pickup, which is obliquely upwardly or downwardly screwed into the inclined piece portion so that a lower part thereof is placed at an inner part of the pickup, a flange-like holding portion that is provided in such a way as to be integral with the lower part of this screw and that has a sidewise-H-like section in a plan view thereof, and that is fitted to the opposite opening edge, so that the bottom surface edge of an upper flange portion abuts against a part of the top surface of the drive chassis, which is in the vicinity of the opening edge, and so that the bottom surface edge of this screw laterally moves by sliding along and being in contact with the part of the top surface, which is in the proximity of the opening edge, when the pickup laterally moves.

According to an embodiment (hereunder referred to as a third pickup adjusting mechanism of the invention) of the second adjusting mechanism of the invention, at least the bottom surface side portion of the peripheral edge of the upper flange-like portion of the flange-like holding portion is chamfered, so that an inner edge part of the chamfered portion laterally moves by sliding along and being in contact with the top surface placed in the vicinity of the opening edge.

According to an embodiment (hereunder referred to as a fourth pickup adjusting mechanism of the invention) of the second adjusting mechanism of the invention, a mounting angle (θ) of the screw screwed into the pickup with respect to the drive chassis is set in such a way as to be larger than an adjusting amount of the tilt angle of the pickup.

BRIEF DESCRIPTION OF THE DRAWINGS

FIGS. 1A to 1C illustrate a pickup adjusting mechanism of a disk player according to an embodiment of the invention, a wherein FIG. 1A is a perspective view illustrating a pickup moving structure, FIG. 1B is an enlarged sectional view illustrating a primary part thereof, and FIG. 1C is a top view of a screw.

FIG. 2A is an exploded perspective view illustrating the state of the conventional optical head at the time before mounted in a recording/reproducing apparatus, and FIG. 2B is a perspective view illustrating the state of the conventional optical head at the time after mounted therein.

FIG. 6A is a side view illustrating the conventional optical axis adjusting device, and FIG. 6B is a top view illustrating the conventional optical axis adjusting device.

DETAILED DESCRIPTION OF THE PREFERRED EMBODIMENTS

Hereinafter, a pickup adjusting mechanism for a disk player according to an embodiment of the invention will be described by referring to the accompanying drawings.

Figure 1A:
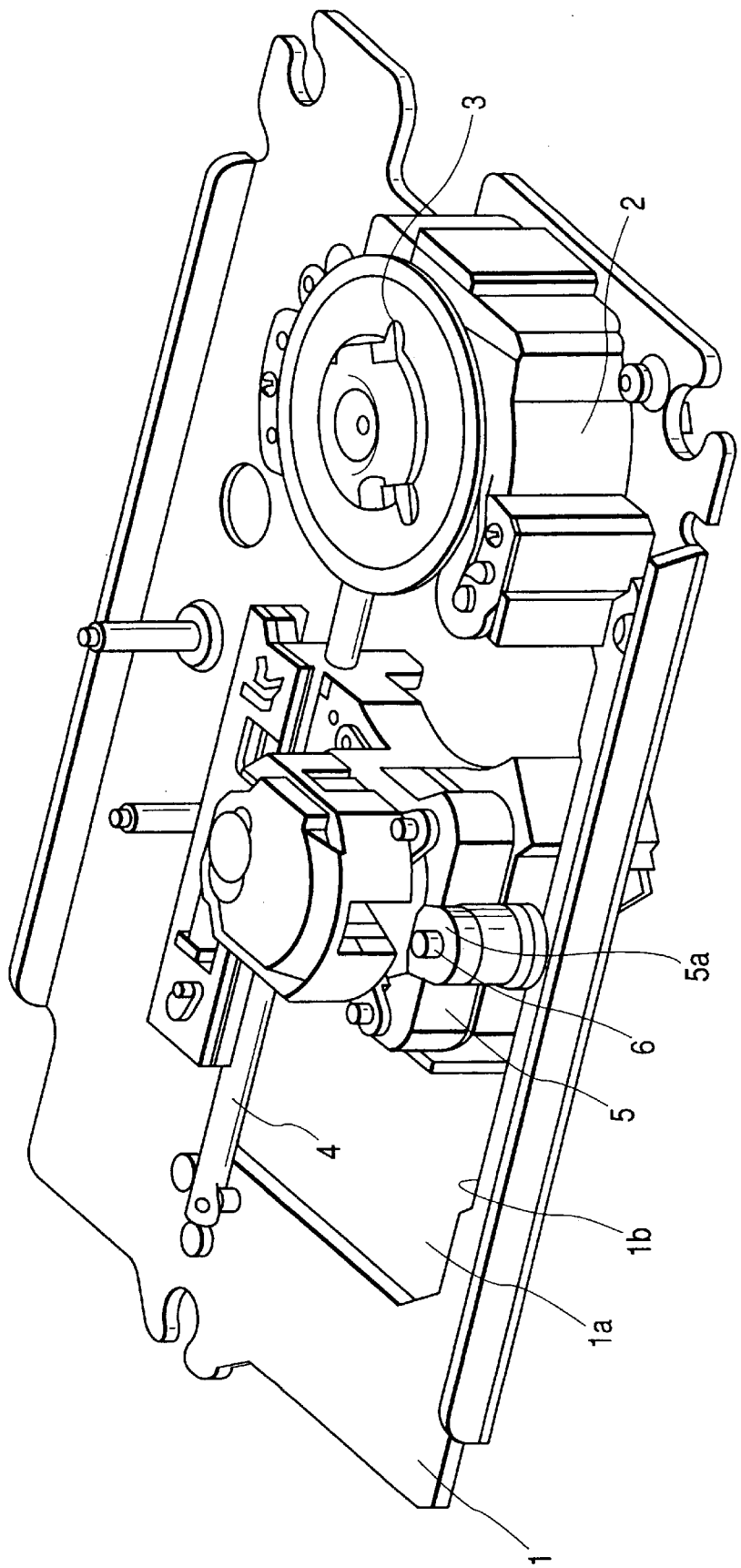
Figure 1B:
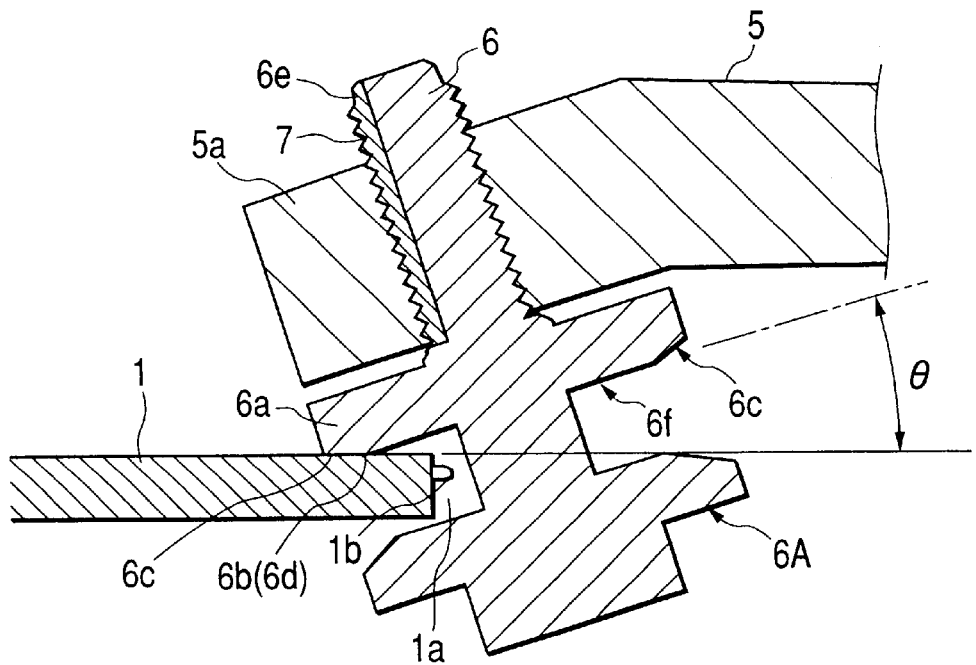
Figure 1C:
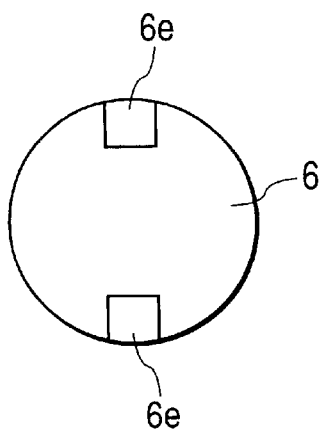
Figure 2B:
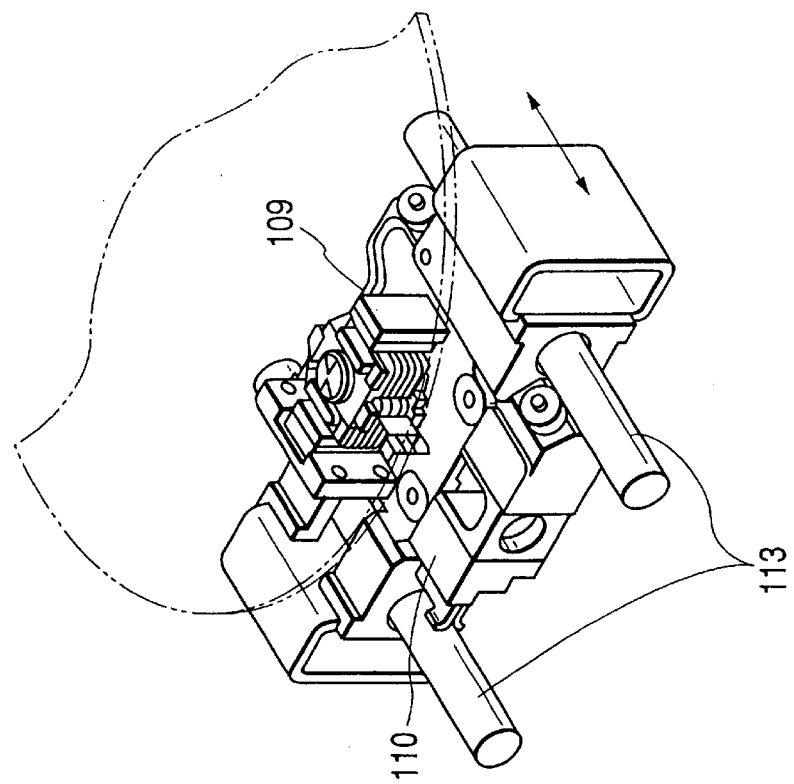
FIGS. 2A and 2B illustrate a conventional optical head.
Figure 2A:
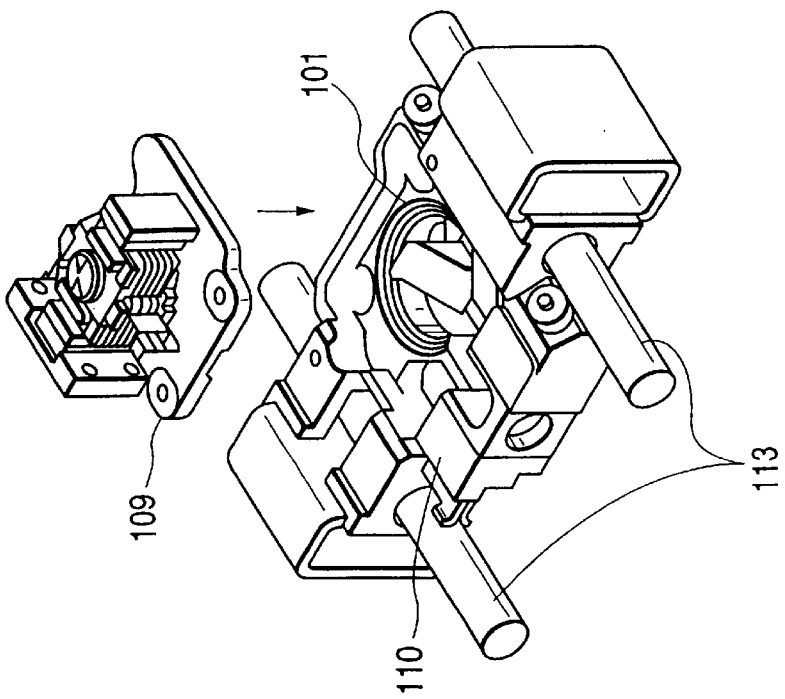
Figure 3:
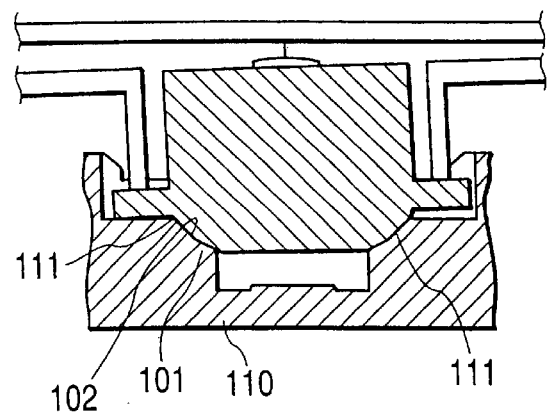
FIG. 3 is a schematic sectional view illustrating an operation of the optical head.
Figure 4:
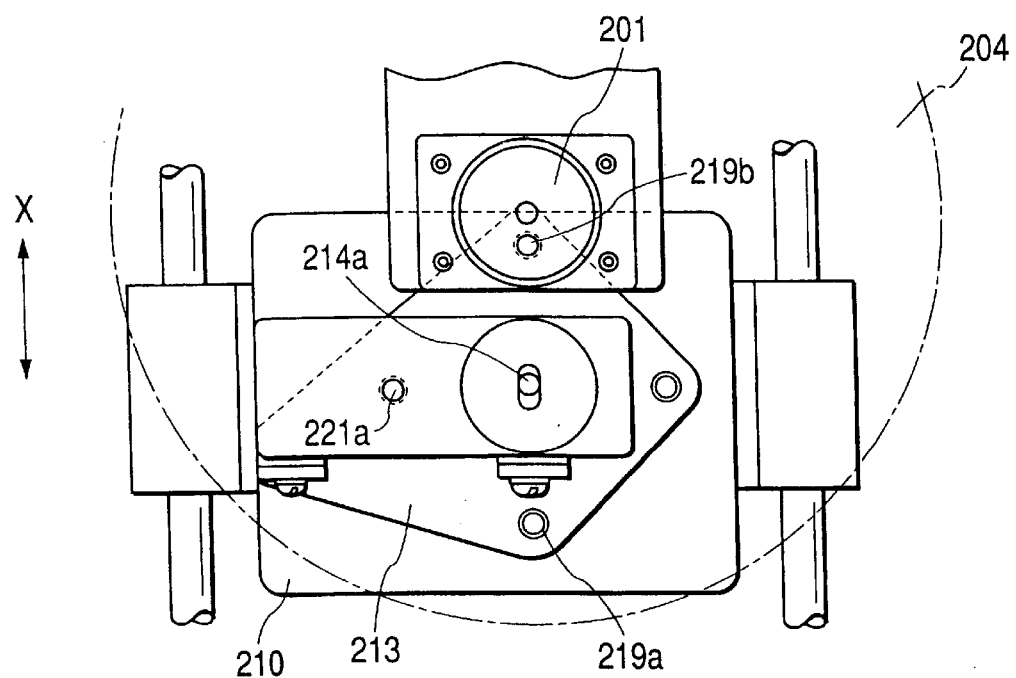
FIG. 4 is a plan view illustrating a primary part of a CD player, which shows a conventional pickup adjusting mechanism for a disc player.
Figure 5:
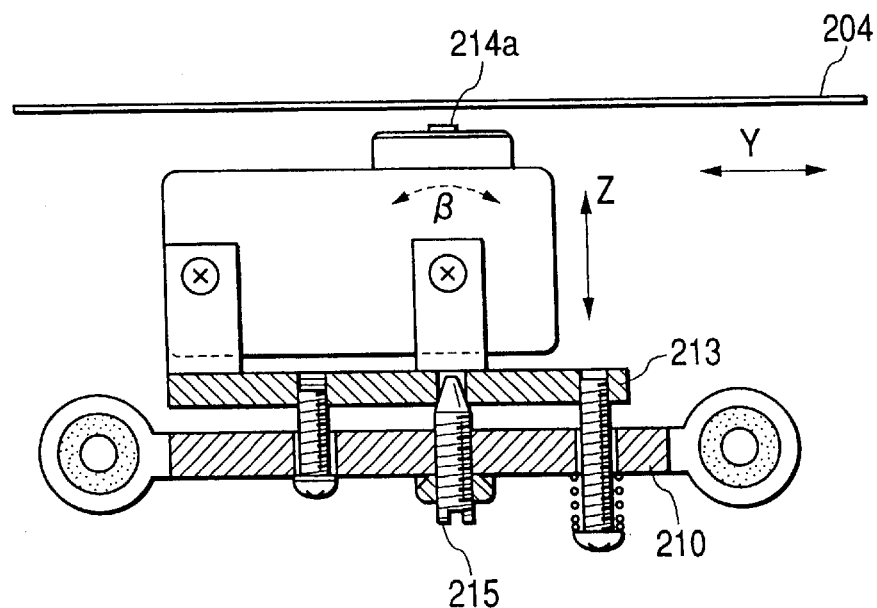
FIG. 5 is a front sectional view of the primary part thereof.

FIGS. 1A to 1C illustrate a pickup adjusting mechanism, which is the embodiment of the invention, for a disk player.

FIG. 1A is a perspective view illustrating a pickup moving structure, FIG. 1B is an enlarged sectional view illustrating a primary part thereof, and FIG. 1C is a top view of a screw.

As shown in FIG. 1A, the pickup adjusting mechanism of this embodiment for a disc player is adapted so that a drive chassis 1 is disposed in the disc player. An opening portion 1a is provided inside this drive chassis 1. In this drive chassis 1, a spindle motor 2 is provided at the right-hand end thereof. Moreover, a turntable 3 is provided on the top portion of the spindle motor 2. Furthermore, a main shaft 4 and pickup 5, which has a one side portion guided by this main shaft 4 and is adapted to laterally move, are provided on the drive chassis 1.

The pickup 5 has an inclined piece portion 5a tilting frontwardly and obliquely downwardly. A screw 6 made of resin for adjusting a tilt angle of the pickup 5 by being forwardly and backwardly screwed there into is obliquely upwardly or downwardly screwed into this inclined piece portion 5a so that a lower part thereof is placed at an inner part of the pickup 5. A flange-like holding portion 6A, which is provided in such a way as to be integral with the lower part of this screw 6 and has a sidewise-H-like section, as viewed from front of FIG. 1B, is configured so that the bottom surface edge 6b of an upper flange portion 6a of the flange-like holding portion 6A of the screw 6 abuts against a part of the top surface of the drive chassis 1, which is in the vicinity of an opening edge 1b opposite to an opening portion 1a of the drive chassis 1, and that the bottom surface edge 6b of this screw 6 laterally moves by sliding along the part of the top surface, which is in the vicinity of the opening edge 1b, of the drive chassis 1 when the pickup 5 laterally moves.

After the screw 6 has been upwardly or downwardly screwed in order to adjust the tilt angle of the pickup 5, an adhesive 7 is filled into a slit portion 6e formed along an axial direction of the screw portion and then solidified so that the screw 6 is subjected to detent.

The bottom surface side portion of the peripheral edge of the upper flange-like portion 6a of the flange-like holding portion 6A is chamfered, so that an inner edge part 6d of this chamfered portion 6c laterally moves by sliding along the top surface placed in the vicinity of the opening edge 1b while the inner edge part is in point contact therewith.

Further, a mounting angle θ of the screw 6 screwed into the pickup 5 with respect to the drive chassis 1 is set in such a way as to be larger than an adjusting amount α of the tilt angle of the pickup 5.

Figure 7:
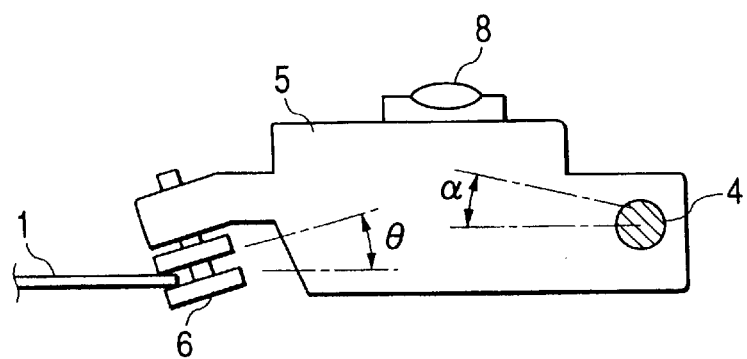
FIG. 7 is a schematic view showing a relationship between an adjusting amount α of a tilt angle of the pickup and a mounting angle θ of the screw.
Figure 6B:
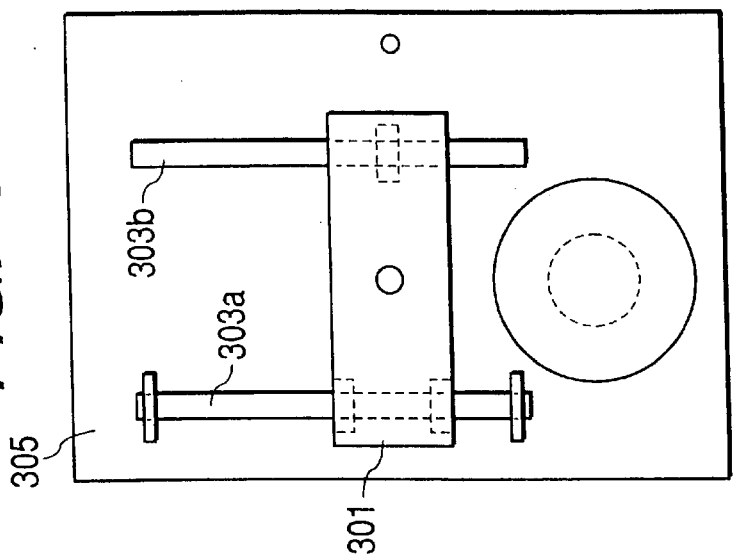
FIGS. 6A and 6B illustrate a conventional optical axis adjusting device of the pickup in the CD player.
Figure 6A:
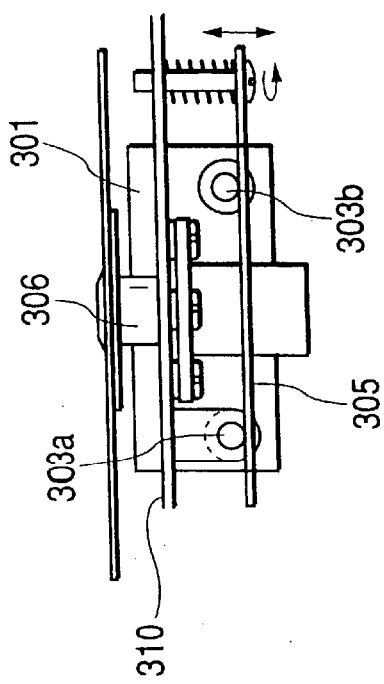

The relationship of the adjusting amount α of the tilt angle of the pickup 5 and the mounting angle θ of the screw 6 is schematically shown in FIG. 7. The adjusting amount α a of the tilt angle is an angle for adjusting the optical axis of the pickup lens 8, and the screw 6 is upwardly or downwardly screwed so that the entire pickup 5 rotates around the main shaft 5, thereby adjusting the adjusting amount α of the tilt angle. The adjusting amount α is normally adjusted to 3 degrees or less. Therefore, the mounting angle θ of the screw 6 with respect to the drive chassis 1 is normally set to 3 degrees or more.

Since the mounting angle θ is so adjusted as to be larger than the required adjusting amount α, when the adjusting amount α is set to be maximum (that is, when the screw 6 is downwardly screwed to the maximum), a lower plane 6f of the upper flange-like portion 6a of the screw 6 comes closer to horizon (that is, in parallel with the face of the drive chassis 1) Even in this situation, the lower plane 6f does not come to horizon because of θ>α, and the lower plane 6f is prevented from being in surface contact with the face of the drive chassis 1.

According to the pickup adjusting mechanism of the disc player of this embodiment, with the aforementioned configuration, the inner edge part 6d of the chamfered portion 6c provided at the bottom surface side of the peripheral edge of the upper flange portion 6a of the flange-like holding portion 6A of the screw 6 placed at the secondary shaft side part opposite to the side part, which is guided by the main shaft 4, of the pickup 5 can laterally move by sliding along the part of the top surface, which is placed in the vicinity of the opening edge 1b of the opening portion 1a, while being in point contact therewith. Thus, the reliability in holding a secondary shaft side part of the pickup 5 can be enhanced. Consequently, the pickup 5 can stably perform lateral movement with respect to the drive chassis 1.

Further, the edge of the drive chassis 1 is not in contact with the bottom surface of the upper flange portion 6a of the flange-like holding portion 6A of the screw 6. Thus, the pickup 5 can stably perform the lateral movement even after the tilt angle is adjusted.

As described above, according to an aspect of the invention, there is provided the first pickup adjusting mechanism of the invention for a disc player, which comprises an inclined piece portion tilted frontwardly and obliquely downwardly in an opening portion inside a drive chassis and provided at a side opposite to a main shaft in a pickup adapted to laterally move by being guided at one side thereof by the main shaft, a screw for adjusting a tilt angle of the pickup, which is obliquely upwardly or downwardly screwed into the inclined piece portion so that a lower part thereof is placed at an inner part of the pickup, a flange-like holding portion that is provided in such a way as to be integral with the lower part of this screw and that has a sidewise-H-like section in a plan view thereof, and that is fitted to the opposite opening edge, so that the bottom surface edge of an upper flange portion abuts against a part of the top surface of the drive chassis, which is in the vicinity of the opening edge, and so that the bottom surface edge of this screw laterally moves by sliding along and being in contact with the part of the top surface, which is in the proximity of the opening edge, when the pickup laterally moves. In this mechanism, at least the bottom surface side portion of the peripheral edge of the upper flange-like portion of the flange-like holding portion is chamfered, so that an inner edge part of this chamfered portion laterally moves by sliding along and being in contact with the top surface placed in the vicinity of the opening edge. Moreover, the mounting angle $\theta$ of the screw screwed into the pickup with respect to the drive chassis is set in such a way as to be larger than an adjusting amount of the tilt angle of the pickup. Thus, the first pickup adjusting mechanism has the following effects.

That is, upon completion of adjustment of the tilt angle, the inner edge part of the chamfered portion provided at the bottom surface side of the peripheral edge of the upper flange portion of the flange-like holding portion of the screw placed at the secondary shaft side part opposite to the side part, which is guided by the main shaft, of the pickup can laterally move by sliding along the part of the top surface, which is placed in the vicinity of the opening edge of the opening portion 1a, while being in point contact therewith. Thus, the reliability in holding the secondary shaft side part of the pickup can be enhanced. Consequently, the pickup can stably perform lateral movement with respect to the drive chassis.

Furthermore, at least the bottom surface side portion of the peripheral edge of the upper flange-like portion of the flange-like holding portion is chamfered, so that the inner edge part of this chamfered portion laterally moves by sliding along and being in contact with the top surface placed in the vicinity of the opening edge. Therefore, an interior angle (see FIG. 1B) of the inner edge part of the chamfered portion is an obtuse one, so that wear due to friction caused by this portion can be reduced. Consequently, the CD player using this mechanism excels in durability.

Moreover, the mounting angle $\theta$ of the screw screwed into the pickup with respect to the drive chassis is set in such a way as to be larger than an adjusting amount of the tilt angle of the pickup. Thus, the lateral movement of the pickup can be made to be a stable operation even after the tilt angle is adjusted.

According to another aspect of the invention, there is provided the second pickup adjusting mechanism of the invention for a disc player, which comprises an inclined piece portion tilted frontwardly and obliquely downwardly in an opening portion inside a drive chassis and provided at a side opposite to a main shaft in a pickup adapted to laterally move by being guided at one side thereof by the main shaft, a screw for adjusting a tilt angle of the pickup, which is obliquely upwardly or downwardly screwed into the inclined piece portion so that a lower part thereof is placed at an inner part of the pickup, a flange-like holding portion that is provided in such a way as to be integral with the lower part of this screw and that has a sidewise-H-like section in a plan view thereof, and that is fitted to the opposite opening edge, so that the bottom surface edge of an upper flange portion abuts against a part of the top surface of the drive chassis, which is in the vicinity of the opening edge, and so that the bottom surface edge of this screw laterally moves by sliding along and being in contact with the part of the top surface, which is in the proximity of the opening edge, when the pickup laterally moves. Thus, the second pickup adjusting mechanism has the following effects.

That is, upon completion of adjustment of the tilt angle, the inner edge part of the chamfered portion provided at the bottom surface side of the peripheral edge of the upper flange portion of the flange-like holding portion of the screw placed at the secondary shaft side part opposite to the side part, which is guided by the main shaft, of the pickup can laterally move by sliding along the part of the top surface, which is placed in the vicinity of the opening edge of the opening portion 1a, while being in point contact therewith. Thus, the reliability in holding the secondary shaft side part of the pickup can be enhanced. Consequently, the pickup can stably perform lateral movement with respect to the drive chassis.

The third pickup adjusting mechanism of the invention is configured so that at least the bottom surface side portion of the peripheral edge of the upper flange-like portion of the flange-like holding portion is chamfered, and so that the inner edge part of this chamfered portion laterally moves by sliding along and being in contact with the top surface placed in the vicinity of the opening edge. Thus, an interior angle (see FIG. 1B) of the inner edge part of the chamfered portion is an obtuse one, so that wear due to friction caused by this portion can be reduced. Consequently, the CD player using this mechanism excels in durability.

The fourth pickup adjusting mechanism of the invention is adapted so that the mounting angle $\theta$ of the screw screwed into the pickup with respect to the drive chassis is set in such a way as to be larger than the adjusting amount of the tilt angle of the pickup. Thus, even after the tilt angle is adjusted, the lateral movement of the pickup can be made to be a stable operation.

What is claimed is:

1. A pickup adjusting mechanism for a disc player, comprising:

an inclined piece portion tilted frontwardly and obliquely downwardly in an opening portion inside a drive chassis and provided at a side opposite to a main shaft in a pickup adapted to laterally move by being guided at one side thereof by said main shaft;

a screw for adjusting a tilt angle of said pickup, which is obliquely upwardly or downwardly screwed into said inclined piece portion so that a lower part thereof is placed at an inner part of said pickup; and a flange-like holding portion that is provided in such a way as to be integral with said lower part of said screw and that has a sidewise-H-like section in a plan view thereof, and that is fitted to said opposite opening edge, so that said bottom surface edge of an upper flange portion abuts against a part of said top surface of said drive chassis, which is in vicinity of said opening edge, and so that said bottom surface edge of said screw laterally moves by sliding along and being in contact with said part of said top surface, which is in proximity of said opening edge, when said pickup laterally moves;

wherein at least a bottom surface side portion of a peripheral edge of said upper flange-like portion of said flange-like holding portion is chamfered, so that an inner edge part of said chamfered portion laterally moves by sliding along and being in contact with said top surface placed in vicinity of said opening edge, and wherein a mounting angle ($\theta$) of said screw screwed into said pickup with respect to said drive chassis is set in such a way as to be larger than an adjusting amount of the tilt angle of said pickup.

2. A pickup adjusting mechanism for a disc player, comprising:

an inclined piece portion tilted frontwardly and obliquely downwardly in an opening portion inside a drive chassis and provided at a side opposite to a main shaft in a pickup adapted to laterally move by being guided at one side thereof by said main shaft;

a screw for adjusting a tilt angle of said pickup, which is obliquely upwardly or downwardly screwed into said inclined piece portion so that a lower part thereof is placed at an inner part of the pickup; and a flange-like holding portion that is provided in such a way as to be integral with said lower part of said screw and that has a sidewise-H-like section in a plan view thereof, and that is fitted to said opposite opening edge, so that said bottom surface edge of an upper flange portion abuts against a part of said top surface of said drive chassis, which is in vicinity of said opening edge, and so that said bottom surface edge of said screw laterally moves by sliding along and being in contact with said part of said top surface, which is in proximity of said opening edge, when said pickup laterally moves.

3. The pickup adjusting mechanism for a disc player according to claim 2, wherein at least a bottom surface side portion of a peripheral edge of said upper flange-like portion of said flange-like holding portion is chamfered, so that an inner edge part of said chamfered portion laterally moves by sliding along and being in contact with said top surface placed in vicinity of said opening edge.

4. The pickup adjusting mechanism for a disc player according to claim 2, wherein a mounting angle ($\theta$) of said screw screwed into said pickup with respect to said drive chassis is set in such a way as to be larger than an adjusting amount of the tilt angle of said pickup.

* * * * *